Figure 1:
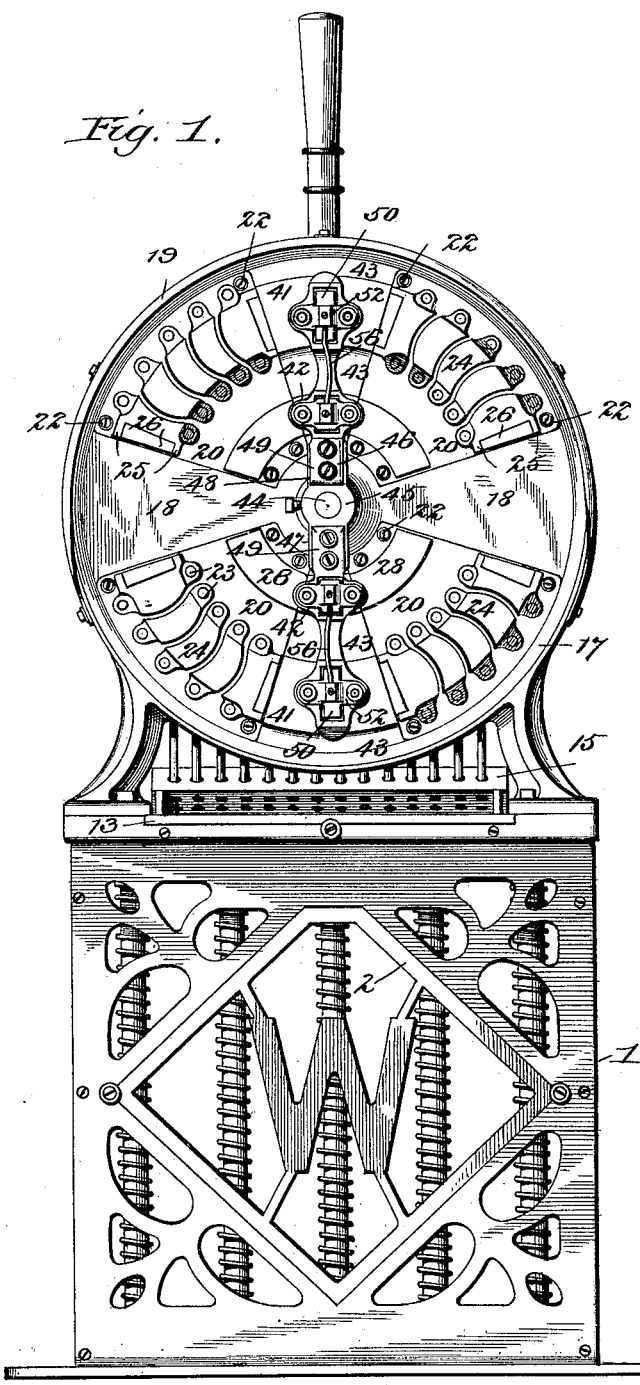

No. 653,857. Patented July 17, 1900.
E. H. WISE.
ELECTRICAL CONTROLLER.
(Application filed Jan. 19, 1900.)

(No Model.) 5 Sheets—Sheet 1.

Witnesses
Geo. E. Thackray.

Inventor
Edgar H Wise

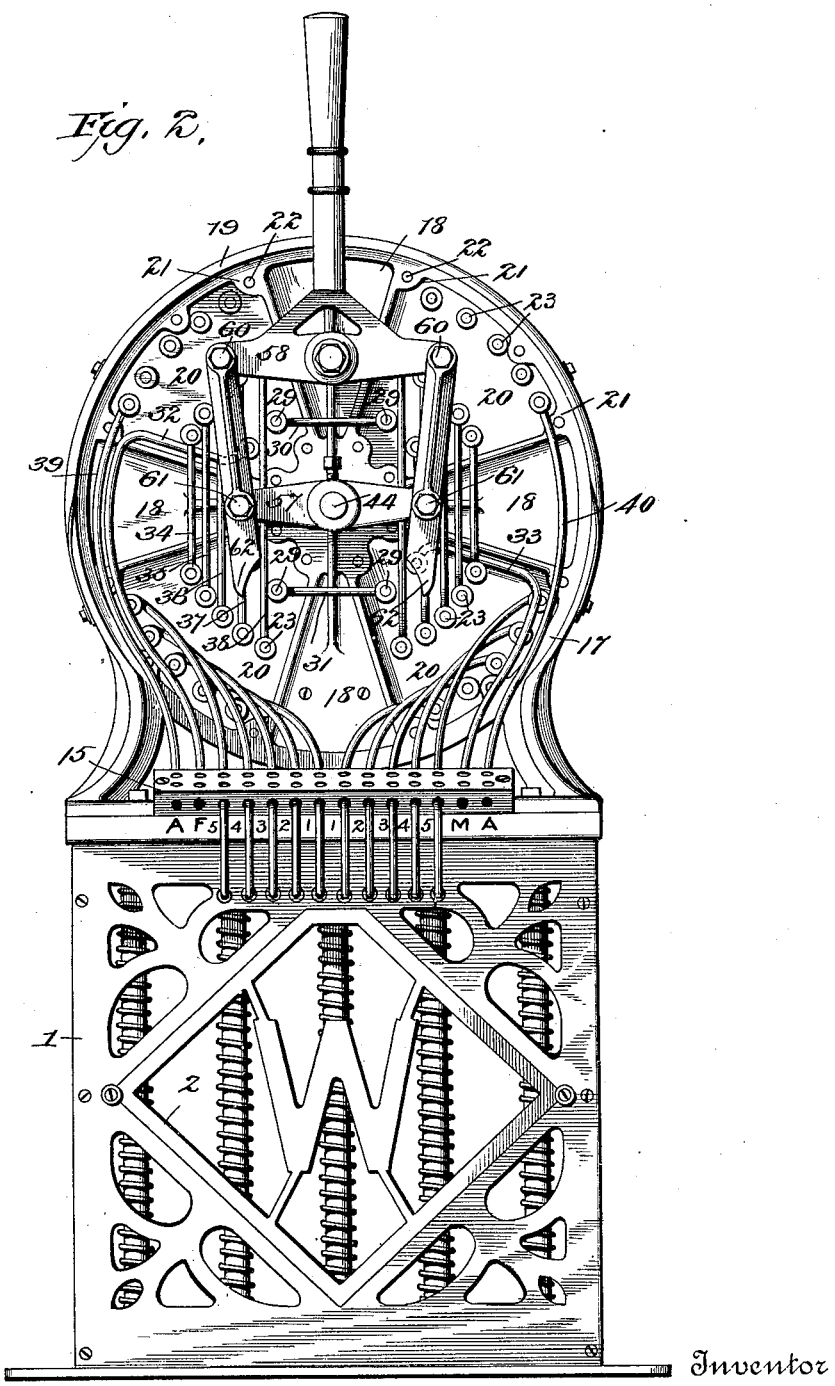

No. 653,857. Patented July 17, 1900.
E. H. WISE.
ELECTRICAL CONTROLLER.
(Application filed Jan. 19, 1900.)
(No Model.) 5 Sheets—Sheet 3.
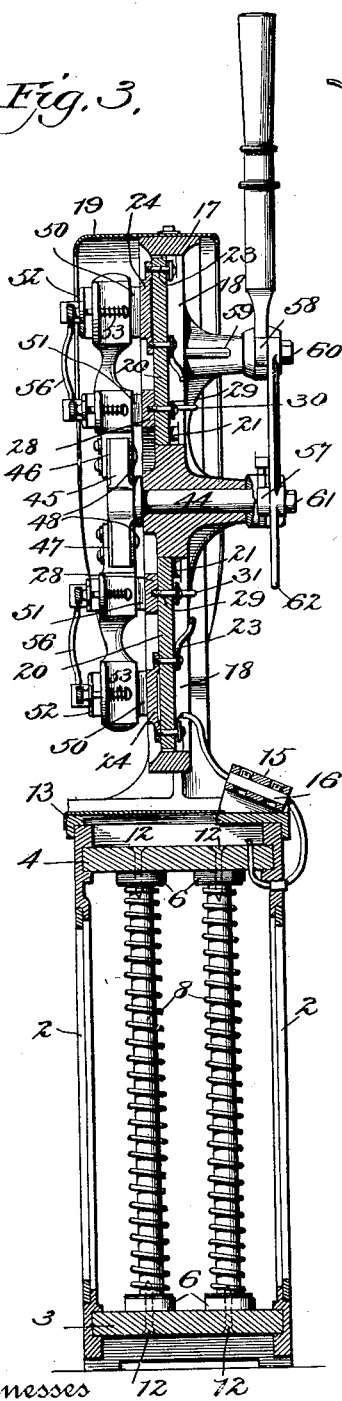
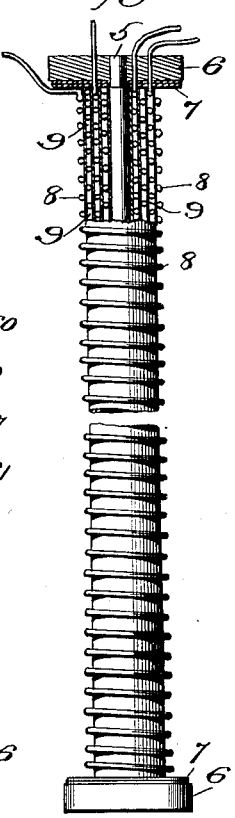
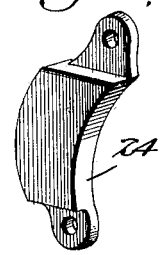
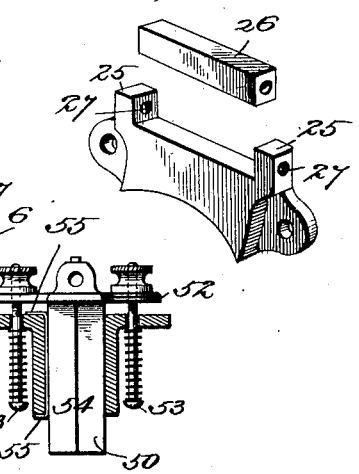
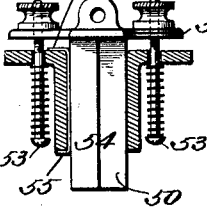
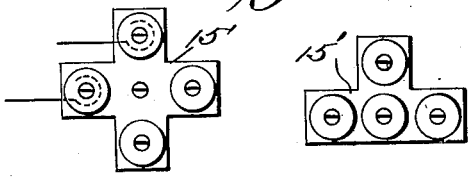
Witnesses
Geo. E. Thackray
Inventor
Edgar H. Wise
THE NORRIS PETERS CO., PHOTO-LITHO., WASHINGTON, D. C.

No. 653,857. Patented July 17, 1900.
E. H. WISE.
ELECTRICAL CONTROLLER.
(Application filed Jan. 19, 1900.)
(No Model.) 5 Sheets—Sheet 4.

Witnesses

Inventor
Edgar H. Wise

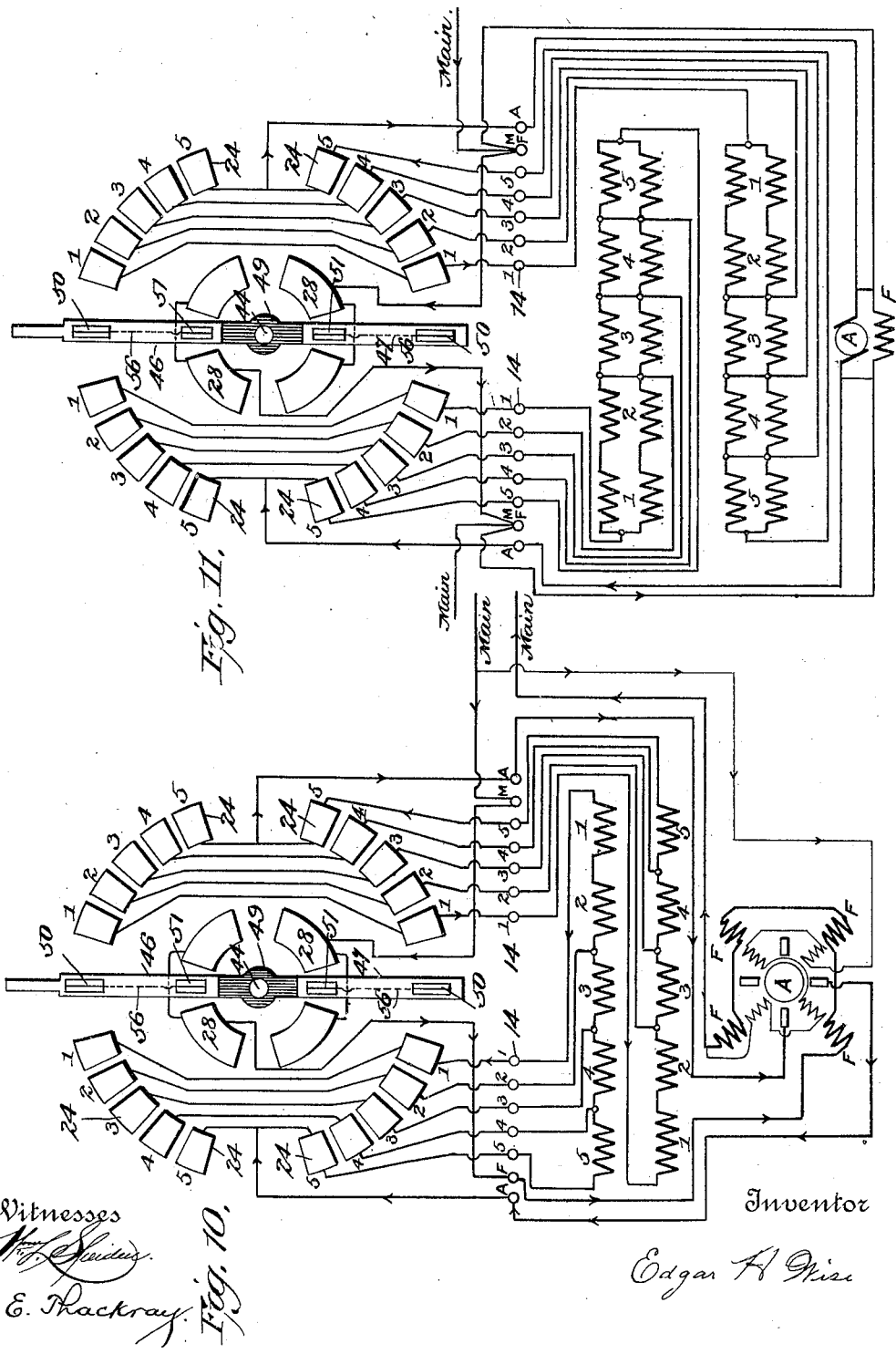

UNITED STATES PATENT OFFICE.

EDGAR H. WISE, OF JOHNSTOWN, PENNSYLVANIA.

ELECTRICAL CONTROLLER.

SPECIFICATION forming part of Letters Patent No. 653,857, dated July 17, 1900.

Application filed January 19, 1900. Serial No. 2,058. (No model.)

*To all whom it may concern:*

Be it known that I, EDGAR H. WISE, a citizen of the United States, residing at Johnstown, in the county of Cambria and State of Pennsylvania, have invented certain new and useful Improvements in Electrical Controllers; and I do hereby declare the following to be a full, clear, and exact description of the invention, such as will enable others skilled in the art to which it appertains to make and use the same.

My invention relates to controllers for series, compound, and shunt wound electric motors generally, and is designed particularly for use in rolling-mills, where frequent reversals and quick action are necessary, in connection with electric cranes, electric tables, electric conveyers, electric chargers, &c., where the service is especially severe on account of the large quantities of metallic dust and other fine material always in the air.

One object of my invention is to obtain compactness, lightness, and durability, and to this end the frame is constructed strongly and rigidly with the use of a comparatively-small quantity of metal.

Another object is to provide a novel form of resistance - coils, whereby the requisite quantity of resistance can be had with the utilization of a comparatively-small amount of space.

A further object is to arrange the contact-segments in groups on insulating material in such a manner that an entire group can be removed at one time by disconnecting the wires and removing the insulating - sector, while at the same time permitting the separate removal of the contact-segments; and to this end the wiring is exposed to view and made easily accessible to facilitate repairs, if necessary. It is also intended that the different parts be so constructed as to be interchangeable.

A still further object is the provision of a novel self-limiting mechanical movement for shifting the lever, whereby the movement of the operating-handle is somewhat multiplied and quick action of the switch-lever insured, which is confined within certain limits.

Another object is to provide an improved connection-board for the terminals of the resistances, contact-segments, and main, armature, and field wires, whereby different connections may be effected, as found necessary, to adapt the controller to motors of different windings.

Other objects, generally speaking, are the provision of means for taking up wear in the carbon brushes of the switch-lever and means for rupturing the spark at different points to prevent injury to the apparatus, as well as other details of construction, which will be more fully set forth hereinafter and particularly pointed out in the claims.

Figure 8:
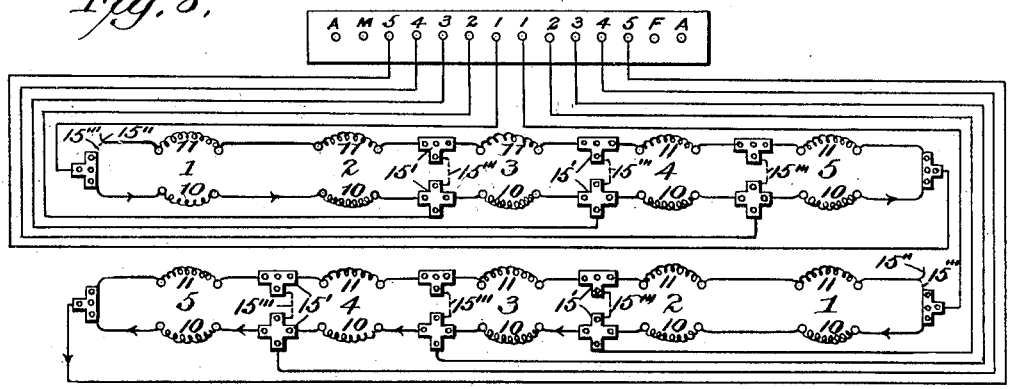
Figure 9:
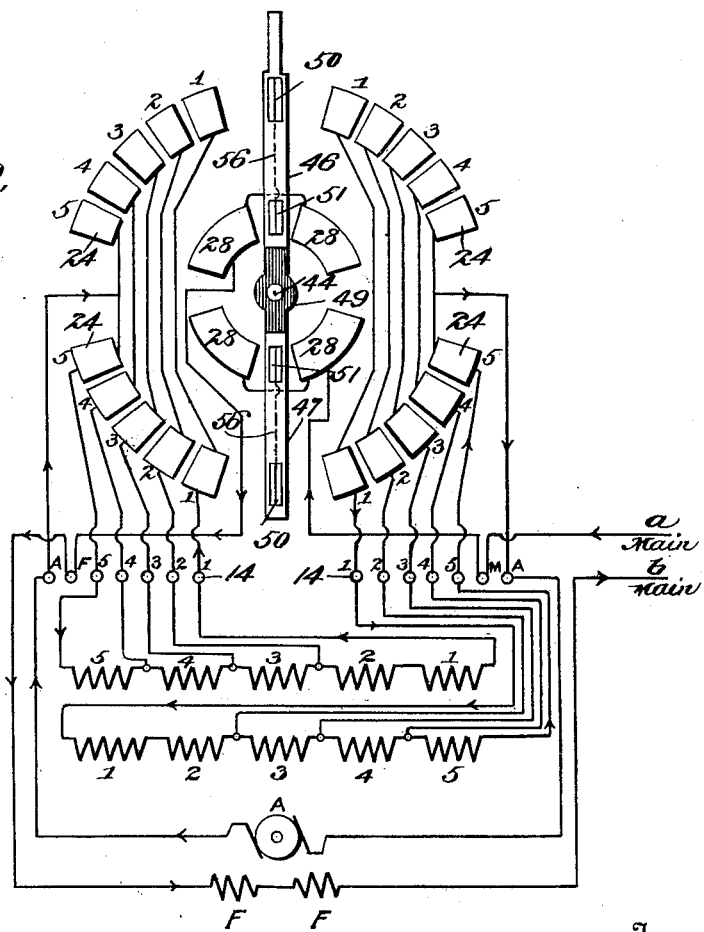

In the accompanying drawings, Figure 1 is a front elevation of the controller; Fig. 2, a rear elevation; Fig. 3, a central vertical sectional elevation; Fig. 4, a detail of a resistance-coil; Fig. 5, a detail of a contact-segment; Fig. 6, a detail of an end contact-segment having the spark-rupturing carbon contact; Fig. 7, a detail showing the scheme for taking up wear in the carbon-brush holders; Fig. 8, a diagrammatic view of the wiring-board; Fig. 9, a diagrammatic view illustrating the manner of wiring for a series motor; Fig. 10, a similar view of the wiring for a compound-wound motor; Fig. 11, a diagrammatic view illustrating how the resistances can be coupled in multiple for use with a shunt-motor, and Fig. 12 detail views of the terminal connectors of the wiring-board.

The frame 1, containing the resistances, is of an open construction for the sake of lightness and to permit free circulation of air. At the front and back it is provided with large removable panels 2 to give quick access to the coils in the event of trouble and without necessitating dismantling the apparatus to any extent. The frame holds a base-board 3 and a wiring-board 4, as shown in Fig. 3, by which the resistance coils or piles are held in position. These resistance-piles are shown in detail in Fig. 4, where 5 is a central pipe-core, covered with silicabestos, on which are fitted metallic heads 6, having their inner faces insulated by mica washers 7. The resistance-wire is wound in four (more or less, as found desirable in practice) spirals 8, with interposed sheets or walls 9 of silicabestos between the successive spirals or layers of wire. The resistance comprises two entirely-independent coils 10 and 11, (see Fig. 8,) which can be connected in series or in multiple, as will appear more fully hereinafter, to meet the requirements of the service. The construction of the resistance-piles is at once very compact, rigid, and safe. Screws or other suitable fastenings 12, passing through the base and wiring boards and into the ends of the core 5, secure the resistance coils or piles in position, as shown in Fig. 3.

The connections between the coils are made on top of the wiring-board in the space provided for the ends of the wires, and a suitable slide-cover 13 is provided at this point, which permits ease of inspection when desired. Fig. 8, which is a plan view of the wiring-board, illustrates the manner of wiring. To better illustrate the manner of wiring, especially in connection with diagrammatic Figs. 9, 10, and 11, I have numbered each row of resistance coils or piles serially from 1 to 5, and the apertures 14, through which the terminals pass onto the connection-board, are correspondingly designated. It will be observed that each row of five piles or coils is connected up in series, so that on starting the motor the entire resistance of all the coils (ten in number) is cut in, as will appear more clearly later. Each row of resistance-piles corresponds in number (five) to one group of contact-segments on the upper part of the apparatus, and each numbered opening 14 eventually leads to a corresponding contact-segment.

As shown in Fig. 8, one coil of each resistance-pile is connected in series with one of the coils of the next adjoining pile, and so on to the end of the row. The other coils of the same row of piles are similarly connected with each other. The connection between the terminals of the coils of two adjacent piles is made by the connectors 15', (shown in Fig. 12,) and the arrangement is such that the current passes through the set of coils 10 of one row of resistance-piles, but not through the other serially-arranged set of coils 11 of the same row of piles, as the circuit of the latter is left open at 15'', and afterward through the other row of piles in a similar manner after passing through the switch mechanism. This is the case when the coils are connected in series, as when the controller is used with a series or compound wound motor. When the controller is to be used with a shunt-wound motor, cross-connections 15''' are made on the wiring-board between the connections 15' and also at the open circuit 15'', thus throwing the coils of the resistance-piles of the row in multiple with each other and halving the total resistance. The connection-board 15, heretofore referred to, is located at the back of the machine in an inclined position to facilitate the leading in and out of the wires. This board has holes corresponding to the openings 14 and similarly numbered, in which are located double connectors 16. In addition to the numbered openings there are an A (motor-armature) opening and an F (motor-field) opening at one end of the connection-board and an A (motor-armature) opening and an M (current-main) opening at the opposite end of the board, in all of which openings are located double connectors. The switch mechanism is positioned in a circular frame 17, secured on frame 1, having a four-arm spider 18 cast integral therewith and provided with an overhanging protecting hood or shell 19. In the spaces between the spider-arms are fitted sector-shaped pieces 20 of insulating fiber, mica, or porcelain, which are secured to ears 21 on the frame by screws 22, thus permitting their easy removal at any time. Each insulating-piece 20 has secured thereto by screws 23 five metallic contact-segments 24 for the resistance, of the shape clearly shown in Fig. 5. The curvature of the preceding segment making it entrant into the succeeding one insures a closed circuit at all times while the brushes on the switch-lever are passing from one segment to the adjoining one, thus entirely obviating all sparking. With the foregoing construction the group of contacts can either be removed collectively or individually, as desired, thus facilitating repairs. The end contacts, Fig. 6, of each group are provided with ears 25, between which is fitted a carbon block 26, held by screws 27. Protection is thus had against injurious sparking and the parts are made interchangeable. Each insulating-piece 20 is also equipped with a segmental metallic contact 28, held by screws 29. The two upper contacts 28 are cross-connected by wire 30 and the two lower ones by wire 31. A wire 32 connects the upper pair of contacts to the F terminal of the connection-board, and a wire 33 leads from the lower pair of contacts to the M terminal of the board. The groups of contact-segments on the two sides of the controller have their corresponding members cross-connected by the wires 34, 35, 36, 37, and 38, and wires 39 and 40 lead from the lower segments of the upper groups to the respective terminals A A of the connection-board. The dead-spaces on the front of the controller have insulating-segments 41 and 42, seated on a mica-backing 43 and properly secured to the vertical arms of the spider. The switch-lever shaft 44, which is journaled in the hub of the spider, has the central member 45 of the lever secured thereto. The active metallic sections 46 and 47 of the switch-lever have their ends 48 fitted in sockets in the ends of the central member 45, but insulated therefrom by the material 49 and secured thereto by suitable screws or bolts. Double carbon brushes 50 and 51, the one adapted to bear on the contact-segments and the other on the main contacts 28, slide freely in suitable boxes in the active sections of the switch-arm. The brushes are fed by clips 52, urged by spring-actuated bolts 53, adjustably connected to the clips by nuts and passing loosely through ears on the switch-lever. The boxes in which the carbon brushes move are lined with sheet-metal pieces 54, having bent retaining ends 55, which take up any lost motion between the box and the brush as the latter wears. The brushes are suitably wired to each other at 56. A double rocker 57 is secured on the rear end of the switch-lever shaft 44, and immediately above this rocker at a suitable distance therefrom is a second and longer double rocker 58, having an operating-handle which is pivoted to a boss 59 on the spider. There are two connecting-links, which are pivoted at one end to the extremities of the rocker 58 by bolts 60. They are also pivoted in a loose manner to the ends of rocker 57 at 61. The links extend beyond these points and terminate in concaved tips 62, which abut the hub of rocker 57 when the switch-lever is at the limits of its movement or on the end contact-segments, thus constituting limiting means and preventing too great a throw of the switch-lever.

Referring now to Fig. 9, which shows the controller used with a series motor, and assuming the current to enter from main $a$ and the switch-lever to rest on the first contact 1, (numbered in this fashion for convenience of demonstration,) it will first enter the lower contact-segment 28, pass along the switch-lever to segment 1, thence to connector 1 of the connection-board, and thence through an entire row of resistance-piles in the order 1 2 3 4 5 to connector 5 and to contact-segment 5. It will then pass to the A connector of the connection-board and on through the armature A of the motor, thence to A on the connection-board and to contact 5 of the second lower group of contact-segments, thence to connector 5 of the second group on the connection-board, and after passing through the second row of resistance-piles in the order 5 4 3 2 1 onto connector 1 of the second group and through contact-segment 1 of the lower group to contact-segment 1 of the left upper group, after which it will pass, via the switch-lever, to the upper contact-segment 28, thence to the F F of the motor and to the main $b$. This is the path of the current through the entire ten resistance-piles when the current is first cut in. When the lever is moved onto contacts 2, the coils 1 and 2 of each row of resistance-piles are cut out and the resistance of the remaining piles only is in circuit. Similarly when the lever is swung onto contact-segments 3 coils 1, 2, and 3 of each row are cut out, and so on until all resistance is out and the motor is up to speed. Assuming the current to enter from main $a$, as before, but the switch-lever to be on contacts 1 of the lower left-hand and the upper right-hand groups of contact-segments, the current will enter the armature of the motor in reversed direction, thus accomplishing a reversal of rotation, while the action of cutting out the resistance-piles will be the same as before, but in reversed order.

The throwing of the switch-lever can be accomplished easily and quickly on account of the leverage obtained by the throwing mechanism, for it will be observed that the action of the switch-lever is faster than that of the operating-lever. When the controller is used with a compound-wound motor, the exterior connections are made as shown in Fig. 10, the resistances being in series, as before.

The limit of ohmic resistance of this controller can of course be made as high as desired, with all the coils in series; but the connection-board affords a convenient device for reducing the total resistance attainable, as the terminals can be connected in such a manner that the two rows of resistance piles or coils will be arranged in multiple instead of in series, thereby adapting the apparatus to motors of greater horse-power. For instance, if the total resistance when the coils are in series is six ohms the controller can be used with, say, a motor of fifteen-horse power, while if they are connected in multiple, so that their total resistance is only three ohms, the machine can be used with, say, a twenty-five-horse-power motor. In this connection Fig. 11 illustrates diagrammatically how the coils may be connected in multiple to give a low or high resistance. The halving of the resistance is accomplished by interposing the cross-connections 15''' and closing the wiring at 15'', which throws the coils in multiple and provides two paths (coils 10 and coils 11) of equal resistance for the passage of the current. This arrangement is used when a shunt-wound motor is to be used, and such motor when connected up with the controller should have its field-terminals entered in the connection-board at the connectors to which the mains are coupled, so that the fields will be in multiple with the mains, while the armature will be in series with the resistances.

Having thus described my invention, what I claim as new, and desire to secure by Letters Patent, is—

1. A resistance-pile composed of two electrically-independent coils, each coil having its terminals separate from those of the other coil and arranged for connection in series or in multiple with the terminals of the other coil.

2. A resistance-pile composed of two electrically-independent coils wound on the same core and insulated from each other, each coil having its terminals separate from those of the other coil and arranged for connection in series or in multiple with the terminals of the other coil.

3. A resistance-pile composed of two electrically-independent coils wound one around the other in concentric relation to each other, each coil having its terminals separate from those of the other coil and arranged for connection in series or in multiple with the terminals of the other coil.

4. In a controller, a resistance-pile composed of successive layers of mechanically and electrically independent spirals of wire and interposed insulating material therefor, each spiral having its own terminals independent of the terminals of the other spiral.

5. In a controller, a resistance-pile composed of two independent coils insulated from each other, and means for bridging or cross-connecting said coils to throw them in multiple.

6. In a controller, the combination with a plurality of resistances, and switch-contacts, of a connection-board having connectors for electrically connecting the terminals of the resistances to the terminals of the switch-contacts, whereby different arrangements of the resistances relatively to the switch-contacts can be had.

7. In a controller, the combination with a plurality of resistances, and switch-contacts, of a connection-board for the terminals of the resistances and the terminals of the switch-contacts, comprising connectors for the respective corresponding terminals, and inlets and outlets on the board for the mains.

8. In a controller, the combination with a wiring-board, of resistances having their terminals normally connected in series on the board, but arranged for cross-connection to throw the resistance in multiple.

9. In a controller, the combination with a wiring-board, of a row of resistance-piles, each composed of two independent resistances, said wiring-board having connectors for connecting in series one coil of each pile with one coil of the other piles, whereby two sets of series resistances are provided, and said connectors being adapted for cross-connection or bridging to throw the coils in multiple.

10. In a controller, contacts for the switch-lever, which are arranged in removable and interchangeable groups.

11. In a controller, contacts for the switch-lever which are arranged in removable and interchangeable groups, each having its contacts independently removable.

12. In a controller, the combination with a frame, of groups of contacts for the switch-lever which are removable and interchangeable, and located in separated arrangement on the frame, with the end contacts of each group provided with material of low-sparking qualities.

13. In a controller, the combination with a frame of spider formation, of panels removably secured to the frame in the spaces between the arms of the spider, and a group of contacts on each panel.

14. In a controller, the combination with a frame of spider formation, of panels removably secured to the frame in the spaces between the arms of the spider, a group of contacts detachably secured to each panel and low-sparking material provided on the end contacts of each group whereby said panels are rendered interchangeable.

15. In a controller, the combination with a frame of spider formation, of panels removably secured to the frame in the spaces between the arms of the spider, a group of contacts secured to each panel, contacts on said panels for the mains, and insulating material secured to the spider-arms and bridging the gap between the groups of contacts on the panels.

16. In a controller, the combination with a contact having oppositely-located ears, of a piece of material approximately square in general cross-sectional outline and of low-sparking quality capable of being reversed and fitted and removably held between the ears, and movable devices for removably connecting said piece to the ears.

17. In a controller, a switch-lever having a brush-box a brush slidable in said box, a clip on the brush, bolts projecting from the clip and passing freely through ears on the box, and springs encircling said bolts and bearing on the ears.

18. In a controller, a switch-lever having a plurality of brush-boxes, brushes slidable in the respective boxes, clips on the respective brushes, adjustable bolts projecting from the respective clips which pass freely through the ears on the boxes, coil-springs encircling said bolts and bearing on the ears and the heads of the bolts, connectors on the respective clips, and an electrical connection between said connectors permitting the brushes to have free independent movement.

19. In a controller, an operating mechanism comprising the combination of a rocker, a second independently-pivoted rocker of greater length than the first, operating means for said second rocker, and links connecting the two rockers on opposite sides of the fulcra, said links being pivoted loosely to one of the rockers.

20. In a controller, an operating mechanism comprising the combination of a rocker, a second independently-pivoted rocker, operating means for said second rocker, links connecting the two rockers together, and an abutment against which the links strike after a predetermined movement has been had.

21. In a controller, an operating mechanism comprising the combination of a rocker, a second independently-pivoted rocker, operating means for said second rocker, links pivoted to the respective rockers on opposite sides of their fulcra and having extended ends, and an abutment against which the extended ends strike after a predetermined movement has been had.

22. In a controller, the combination with a switch-lever and its shaft, of a rocker secured thereon which has a hub, a second independently-pivoted rocker, operating means for said second rocker, links pivoted to the respective rockers on opposite sides of their fulcra and having their ends extended in position to abut the hub of the first-named rocker when the switch-lever is at the proper limit of its movement.

23. In a controller, the combination with groups of contacts and a double switch-lever pivoted so that its ends will travel over the respective groups, of a rocker secured to the switch-lever, a second rocker, operating means for said second rocker, links connecting the respective rockers together, and an abutment for preventing further movement of the links when the extremities of the switch-lever are at the end contacts of the groups aforesaid.

24. In a controller, the combination with groups of contacts and a double switch-lever pivoted at its center so that its ends will travel over the respective groups of contacts, of a rocker secured to the switch-lever and having a hub, a second independently-pivoted rocker, means for operating said second rocker, and links connecting the two rockers on opposite sides of their fulcra and provided with extended ends adapted to abut the hub of the second rocker when the extremities of the switch-lever are on the end contacts of the groups aforesaid.

25. In a reversing controller, the combination with a double switch-lever, four groups of contacts for the lever, and field and main contacts for the lever, of cross-connections between the contact-groups on the opposite sides of the lever, armature-outlets from the end contacts of the groups, and a set of series-connected resistances for each pair of groups of contacts, the independent resistances of which are connected to the respective contacts of the groups.

In testimony whereof I hereto affix my signature in the presence of two witnesses.

EDGAR H. WISE.

Witnesses:
   GEO. E. THACKRAY,
   D. J. JONES.